(12) United States Patent
Kim et al.

(10) Patent No.: US 11,306,183 B2
(45) Date of Patent: Apr. 19, 2022

(54) POLYIMIDE FILM AND METHOD FOR PRODUCING SAME

(71) Applicant: SKC CO., LTD., Gyeonggi-do (KR)

(72) Inventors: Sunhwan Kim, Incheon (KR); Jin Woo Lee, Gyeonggi-do (KR); Dae Seong Oh, Seoul (KR); Dawoo Jeong, Gyeonggi-do (KR); Kyu-Hun Kim, Seoul (KR)

(73) Assignee: SKC CO., LTD., Gyeonggi-do (KR)

( * ) Notice: Subject to any disclaimer, the term of this patent is extended or adjusted under 35 U.S.C. 154(b) by 10 days.

(21) Appl. No.: 16/480,822

(22) PCT Filed: Feb. 5, 2018

(86) PCT No.: PCT/KR2018/001490
§ 371 (c)(1),
(2) Date: Jul. 25, 2019

(87) PCT Pub. No.: WO2018/147605
PCT Pub. Date: Aug. 16, 2018

(65) Prior Publication Data
US 2019/0390014 A1    Dec. 26, 2019

(30) Foreign Application Priority Data

Feb. 8, 2017  (KR) .......................... 10-2017-0017550
Apr. 18, 2017  (KR) .......................... 10-2017-0049736

(51) Int. Cl.
*C08G 73/14*  (2006.01)
*C08J 5/18*  (2006.01)
*C08L 77/00*  (2006.01)

(52) U.S. Cl.
CPC ................ *C08G 73/14* (2013.01); *C08J 5/18* (2013.01); *C08L 77/00* (2013.01); *C08J 2379/00* (2013.01); *C08L 2203/16* (2013.01)

(58) Field of Classification Search
CPC ....... C08J 2379/08; C08J 5/18; C08G 73/106; C08G 73/14; C08L 79/08
See application file for complete search history.

(56) References Cited

U.S. PATENT DOCUMENTS

| | | | |
|---|---|---|---|
| 6,403,005 B1 | 6/2002 | Mientus et al. | |
| 2014/0338959 A1* | 11/2014 | Jung .................. | C08J 7/043 174/253 |
| 2016/0009882 A1* | 1/2016 | Yoon .................. | C08J 5/00 427/342 |

FOREIGN PATENT DOCUMENTS

| JP | 2003-033932 A | 2/2003 |
|---|---|---|
| KR | 10-1090913 | 12/2011 |
| KR | 10-2016-0082639 | 7/2016 |
| KR | 10-2016-0094086 | 8/2016 |
| KR | 10-2016-0095910 | 8/2016 |

OTHER PUBLICATIONS

Office Action issued by Japanese Patent Office dated Jul. 21, 2020.

* cited by examiner

*Primary Examiner* — Gregory Listvoyb
(74) *Attorney, Agent, or Firm* — IP & T Group LLP (57) ABSTRACT

One embodiment may provide a method for producing a polyimide film, the method comprising the steps of: polishing the surface of a casting body; producing a gel sheet by casting a precursor on the polished surface of the casting body, and drying same; and producing a polyimide film by heat-treating the gel sheet, wherein the roughness of the polished surface of the casting body is 0.1 nm to 160 nm, and when the area of the casting body onto which the precursor is casted is partitioned by 1 cm×1 cm, the area corresponding to a defect reduction region is at least 90%, and the polyimide film has a yellowness of at most 3, a haze of at most 1%, a permeability of at least 88%, a modulus of at least 5.0 GPa and a surface hardness of at least HB.

4 Claims, 2 Drawing Sheets

POLYIMIDE FILM AND METHOD FOR PRODUCING SAME

This application is a national stage application of PCT/KR2018/001490 filed on Feb. 5, 2018, which claims priority of Korean patent application number 10-2017-0017550 filed on Feb. 8, 2017 and Korean patent application number 10-2017-0049736 filed on Apr. 18, 2017. The disclosure of each of the foregoing applications is incorporated herein by reference in its entirety.

TECHNICAL FIELD

Embodiments relate to a polyimide film that is colorless, transparent, and excellent in mechanical properties and optical properties with a low surface roughness, and a process for preparing the same.

BACKGROUND ART

Since polyimide (PI) is excellent in resistance to friction, heat, and chemicals, it is employed in such applications as primary electrical insulation, coatings, adhesives, resins for extrusion, heat-resistant paintings, heat-resistant boards, heat-resistant adhesives, heat-resistant fibers, and heat-resistant films.

Polyimide is used in various fields. For example, polyimide is made in the form of a powder and used as a coating for a metal or a magnetic wire. It is mixed with other additives depending on the application thereof. In addition, polyimide is used together with a fluoropolymer as a painter for decoration and corrosion prevention. It also plays a role of bonding a fluoropolymer to a metal substrate. Further, polyimide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyimide has been developed in the form of a film, which is less expensive and has excellent optical, mechanical, and thermal characteristics.

DISCLOSURE OF INVENTION

Technical Problem

Embodiments aim to provide a polyimide film that is colorless, transparent, and excellent in mechanical properties and optical properties with a low surface roughness, and a process for preparing the same.

Solution to Problem

According to an embodiment, there is provided a process for preparing a polyimide film, which comprises polishing a surface of a casting body; casting a precursor on the polished surface of the casting body and drying the cast precursor to produce a gel sheet; and thermally treating the gel sheet to prepare a polyimide film, wherein the polished surface of the casting body has a roughness of 0.1 nm to 160 nm; when the area of the casting body on which the precursor is cast is divided into 1 cm×1 cm; the area falling under a defect reduced region is 90% or more, the defect reduced region referring to a region that satisfies the conditions that the numbers of a first groove, a second groove, a third groove, and a fourth groove, which have a width of 0.3 μm to 3 μm, a depth of 0.5 μm to 5 μm, and a length of 2 μm to less than 3 μm, 3 μm to less than 5 μm, 5 μm to less than 10 μm, and 10 μm or more, respectively, are 10 or less, 5 or less, 3 or less, and 0, respectively, in the divided area of 1 cm 1 cm; and the polyimide film has a yellow index of 3 or less; a haze of 1% or less; a transmittance of 88% or more, a modulus of 5.0 GPa or more, and a surface hardness of HB or higher.

According to an embodiment, there is provided a polyimide film, which has a yellow index of 3 or less, a haze of 1% or less, a transmittance of 88% or more, a modulus of 5.0 GPa or more, and a surface hardness of HB or higher, and which comprises a first surface having a surface roughness of 0.1 nm to 150 nm and a second surface opposite to the first surface and having a surface roughness of 0.1 run to 40 nm, wherein when the first surface is divided into 1 cm×1 cm, the area falling under a defect free region is 90% or more, the defect free region referring to a region that satisfies the conditions that the numbers of a first protrusion, a second protrusion, a third protrusion, and a fourth protrusion, which have a width of 0.3 μm to 3 μm, a height of 0.5 μm to 5 μm, and a length of 2 μm to less than 3 μm, 3 μm to less than 5 μm, 5 μm to less than 10 μm, and 10 μm or more, respectively, are 10 or less, 5 or less, 3 or less, and 0, respectively, in the divided area of 1 cm×1 cm.

According to an embodiment, there is provided a cover window, which comprises the polyimide film.

According to an embodiment, there is provided a display device, which comprises a display panel; and the cover window disposed on the display panel.

Advantageous Effects of Invention

In the process for preparing a polyimide film according to the embodiment, the casting body is polished with fine abrasive particles and a polishing liquid, whereby the polished surface of the casting body has few grooves such as scratches, and the polished surface of the casting body can have a very low roughness.

When a precursor is cast and thermally treated according to the process for preparing a polyimide film, optical defects that may occur when the casting surface of the casting body is transferred to the polyimide film can be prevented.

Accordingly, the process for preparing a polyimide film is capable of providing a polyimide film that is colorless, transparent, and excellent in mechanical properties and optical properties with a low surface roughness, a cover window comprising the film, and a display device comprising the cover window.

DESCRIPTION OF THE NUMERALS

| | | |
|---|---|---|
| 10: display panel | 11: cover window | 20: polyimide film |
| 21: protrusion | 22: first surface | 23: second surface |
| 30: casting body (casting belt) | | 31: groove |
| 50: polishing body | 60: slurry sprayer | 70: cleaning liquid sprayer |
| W: width | D: depth | L: length |
| H: height | | |

BEST MODE FOR CARRYING OUT THE INVENTION

Throughout the description of the embodiments, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. Also, the term "on" or "under" with respect to each element may be referenced to the drawings. For the sake of description, the sizes of individual elements in the appended drawings may be exaggeratingly depicted and do not indicate the actual sizes.

Hereinafter, the present invention will be described in detail with reference to the examples. The examples may be modified into various forms as long as the gist of the invention is not altered.

In this specification, when a part is referred to as "comprising" an element, it is to be understood that the part may comprise other elements as well, unless otherwise indicated.

Further, all numbers and expression related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

Embodiments provide a polyimide film that is colorless, transparent, and excellent in mechanical properties and optical properties with a low surface roughness, a cover window comprising the film, a display device comprising the cover window, and a process for preparing the same.

The process for preparing a polyimide film according to the embodiment comprises polishing a surface of a casting body; casting a precursor on the polished surface of the casting body and drying the cast precursor to produce a gel sheet; and thermally treating the gel sheet to prepare a polyimide film.

A precursor such as a polyamic acid or a polyamide-imide polymer is cast on the casting body.

The casting body may be a casting belt, a casting roll, or the like. Specifically, the casting body may be a casting belt, but it is not limited thereto.

The casting belt may be formed of a flexible metal such as stainless steel or the like, but it is not limited thereto.

The casting surface of the casting body is polished. The casting body may be periodically polished.

Figure 1:
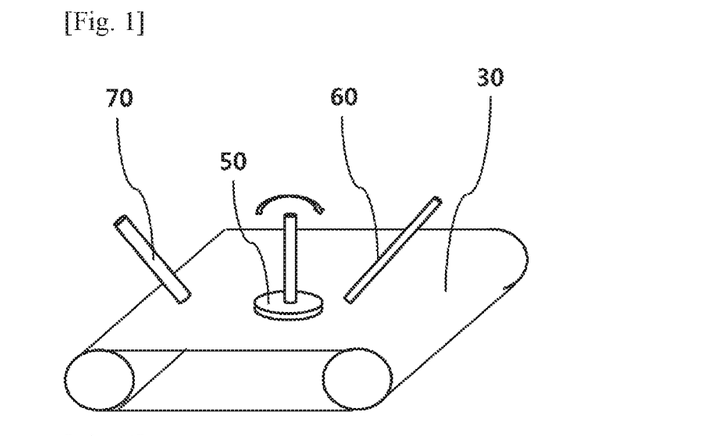
FIG. 1 is a drawing that illustrates a process of polishing a surface of a casting body.

As shown in FIG. 1, the casting body (30) may be polished with a polishing body (50). The polishing body (50) has a pad shape and can rotate by itself. The rotation speed of the polishing body (50) may be about 10 rpm to about 3,000 rpm. Specifically, the rotation speed of the polishing body (50) is about 10 rpm to about 2,000 rpm, about 10 rpm to about 1,500 rpm, about 10 rpm to about 1,000 rpm, about 10 rpm to about 500 rpm, or about 10 rpm to about 300 rpm, but it is not limited thereto. The rotation speed of the polishing body (50) can be appropriately adjusted in consideration of the polishing efficiency, the roughness of the polished surface of the casting body, and the like.

In an embodiment, the polishing body (50) may be a porous polymer in a pad shape or a porous inorganic material in a pad shape, but it is not limited thereto. Here, the "pad shape" refers to a plate shape having a predetermined thickness. The polishing body (50) may be in a disc shape, but it is not limited thereto.

Specifically, the polishing body (50) may be a porous polyurethane in a pad shape; a porous metal body in a pad shape; or a porous slate in a pad shape.

The average pore size of the polishing body (50) may be about 10 μm to about 100 μm, but it is not limited thereto. As the pore size of the polishing body (50) is smaller and more uniform, the surface of the casting body (30) can be more uniformly polished.

For example, IC1000 of Rohm & Haas Company may be used as the polishing body (50). The polishing body (50) may be cut in the form of a disk having an appropriate diameter for use.

A slurry is sprayed to the casting body (30) through a polishing slurry sprayer (60). In the step of polishing the surface of the casting body, the slurry may comprise abrasive particles, a polishing liquid, or both.

The polishing liquid may comprise water or an oxidizing agent. The oxidizing agent may be, for example, hydrogen peroxide, but it is not limited thereto. In addition, the pH of the polishing liquid may be adjusted by an acid or a base. If the polishing liquid comprises an oxidizing agent, the content of the oxidizing agent may be about 0.5% by weight to about 10% by weight or about 1% by weight to about 7% by weight. Further, the pH range of the polishing liquid may be 1 to 4 or 9 to 11. Specifically, the pH range of the polishing liquid may be 1 to 3.5 or 1.5 to 3.0, but it is not limited thereto.

The abrasive particles may be at least one selected from the group consisting of silica, cerin, alumina, titanic, carbon particles, diamond particles, and combinations thereof, but they are not limited thereto.

The average diameter of the abrasive particles may be 30 nm to 100 nm. Further, the average diameter of the abrasive particles may be 30 nm to 80 nm, 30 nm to 70 nm, or 30 nm to 50 nm, but it is not limited thereto. In addition, the abrasive particles may be monodispersed. As the diameter of the abrasive particles is smaller and more monodispersed, the surface of the casting body (30) can be more uniformly polished.

The polydispersity index (PDI) of the abrasive particles may be 0.05 or less. Further, the polydispersity index of the abrasive particles may be 0.005 to 0.05, but it is not limited thereto. Here, the polydispersity index can be obtained with a zetasizer from Malvern. When the particle size distribution has a Gaussian distribution, the PDI may be (width of particle size distribution/average particle size)^2. The closer to monodispersity, the lower the value of PDI.

If the slurry contains abrasive particles, the content of the abrasive particles is 5% by weight to 30% by weight based on the total weight of the slurry. Specifically, the content of the abrasive particles may be 5% by weight to 20% by weight or 5% by weight to 15% by weight based on the total weight of the slurry, but it is not limited thereto.

When the casting body (30) is polished with the polishing body (50), the polishing pressure of the polishing body may be 1 psi to 10 psi, 1 psi to 7 psi, 1 psi to 5 psi, or 2 psi to 5 psi, but it is not limited thereto.

The time for which the casting body (30) is polished with the polishing body (50) is 1 minute to 30 minutes. Specifically, the polishing time may be 1 minute to 20 minutes or 3 minutes to 10 minutes, but it is not limited thereto.

In addition, once the casting body (30) has been polished, the polished surface may be rinsed with a cleaning liquid sprayed through the cleaning liquid sprayer (70). The cleaning liquid may be water, but it is not limited thereto.

The polishing body (50) and the slurry are appropriately used so that the surface of the casting body (30) is uniformly polished. Once the casting body (30) has been rinsed, the polished surface of the casting body 30 is inspected by a 3D microscope or the like. The polishing is continued until the polished surface has no groove such as a scratch or the like and has an appropriate roughness. That is, the surface of the casting body (30) finally polished satisfies the following conditions.

Figure 2:
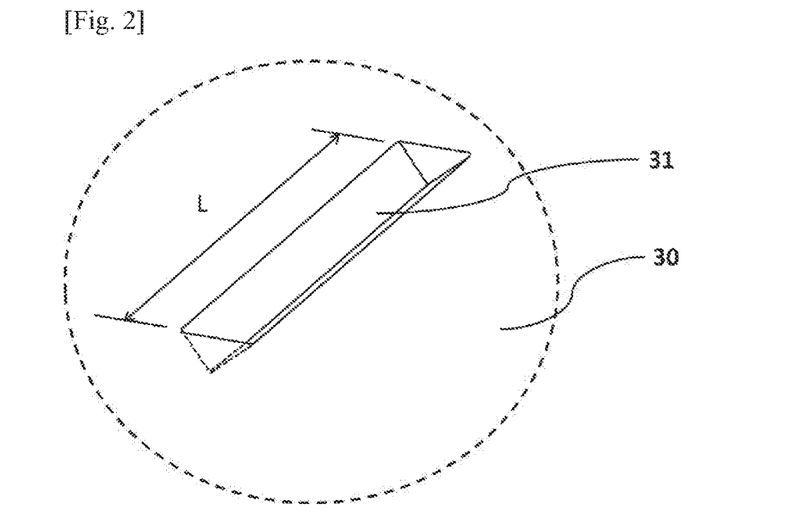
FIG. 2 is a drawing that illustrates a polished surface of a casting body.
Figure 3:
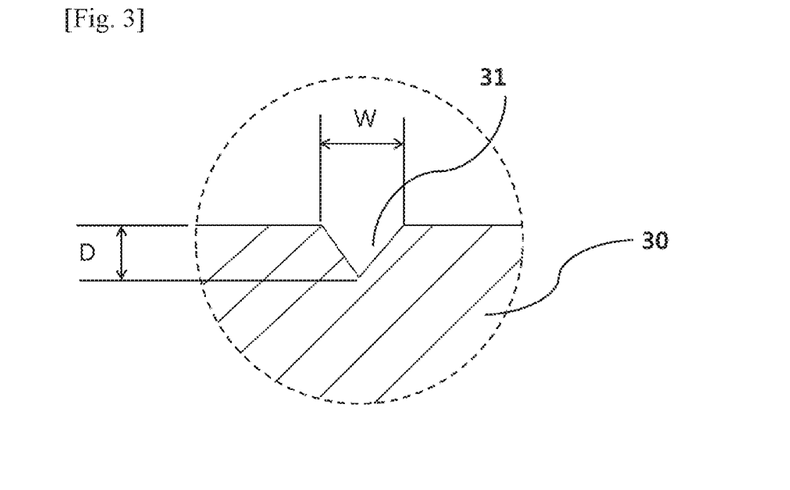
FIG. 3 is a cross-sectional view of a casting body.

As shown in FIGS. 2 and 3, grooves (31) such as scratches may be formed on the polished surface of the casting body (30). The grooves (31) may have an impact on the mechanical and optical characteristics of a polyimide film in the production of the polyimide film. Specifically, the grooves that can affect the mechanical and optical characteristics of a polyimide film may be defined as follows in terms of width (W), depth (D), and length (L).

A first groove has a width of 0.3 µm to 3 µm, a depth of 0.5 µm to 5 µm, and a length of 2 µm to less than 3 µm. A second groove has a width of 0.3 µm to 3 µm, a depth of 0.5 µm to 5 µm, and a length of 3 µm to less than 5 µm. A third groove has a width of 0.3 µm to 3 µm, a depth of 0.5 µm to 5 µm, and a length of 5 µm to less than 10 µm. A fourth groove has a width of 0.3 µm to 3 µm, a depth of 0.5 µm to 5 µm, and a length of 10 µm or more. Specifically, the fourth groove has a length of 10 µm to 100,000 µm.

Specifically, the first groove has a width of 0.2 µm to 3 µm, a depth of 0.3 µm to 5 µm, and a length of 2 µm to less than 3 µm. The second groove has a width of 0.2 µm to 3 µm, a depth of 0.3 µm to 5 µm, and a length of 3 µm to less than 5 µm. The third groove has a width of 0.2 µm to 3 µm, a depth of 0.3 µm to 5 µm, and a length of 5 µm to less than 10 µm. The fourth groove has a width of 0.2 µm to 3 µm, a depth of 0.3 µm to 5 µm, and a length of 10 µm or more.

More specifically, the first groove has a width of 0.15 µm to 3 µm, a depth of 0.2 µm to 5 µm, and a length of 2 µm to less than 3 µm. The second groove has a width of 0.15 µm to 3 µm, a depth of 0.2 µm to 5 µm, and a length of 3 µm to less than 5 µm. The third groove has a width of 0.15 µm to 3 µm, a depth of 0.2 µm to 5 µm, and a length of 5 µm to less than 10 µm. The fourth groove has a width of 0.15 m to 3 µm, a depth of 0.2 µm to 5 µm, and a length of 10 µm or more.

The polished surface of the casting body may be divided into 1 cm×1 cm. If the following conditions are satisfied on each of the polished and divided surfaces of the casting body, it can be defined as a defect reduced region.

When the polished surface of the casting body is divided into 1 cm×1 cm, the defect reduced region can be defined as a region that satisfies the conditions that the number of the first groove is 10 or less, the number of the second groove is 5 or less, 115 the number of the third groove is 3 or less, and the number of the fourth groove is 0.

In other words, the defect reduced region refers to a region that satisfies the conditions that the numbers of the first groove, the second groove, the third groove, and the fourth groove, which have a width of 0.3 µm to 3 µm, a depth of 0.5 µm to 5 µm, and a length of 2 µm to less than 3 µm, 3 µm to less than 5 µm, 5 µm to less than 10 µm, and 10 µm or more, respectively, are 10 or less, 5 or less, 3 or less, and 0, respectively, in the divided area of 1 cm×1 cm.

Specifically, the defect reduced region refers to a region that satisfies the conditions that the numbers of the first groove, the second groove, the third groove, and the fourth groove, which have a width of 0.2 µm to 3 µm, a depth of 0.3 µm to 5 µm, and a length of 2 µm to less than 3 µm, 3 µm to less than 5 µm, 5 µm to less than 10 µm, and 10 µm or more, respectively, are 10 or less, 5 or less, 3 or less, and 0, respectively, in the divided area of 1 cm×1 cm.

More specifically, the defect reduced region refers to a region that satisfies the conditions that the numbers of the first groove, the second groove, the third groove, and the fourth groove, which have a width of 0.15 µm to 3 µm, a depth of 0.2 µm to 5 µm, and a length of 2 µm to less than 3 µm, 3 µm to less than 5 µm, 5 µm to less than 10 µm, and 10 µm or more, respectively, are 10 or less, 5 or less, 3 or less, and 0, respectively, in the divided area of 1 cm×1 cm.

In addition, when the polished surface of the casting body is divided into 1 cm×1 cm, the defect reduced region can be defined as a region that satisfies the conditions that the number of the first groove is 5 or less, the number of the second groove is 3 or less, the number of the third groove is 1 or less, and the number of the fourth groove is 0.

More specifically, when the polished surface of the casting body is divided into 1 cm×1 cm, the defect reduced region can be defined as a region that satisfies the conditions that the number of the first groove is 5 or less, the number of the second groove is 3 or less, the number of the third groove is 0, and the number of the fourth groove is 0.

Specifically when the polished surface of the casting body is divided into 1 cm×1 cm, the defect reduced region can be defined as a region that satisfies the conditions that the number of the first groove is 3 or less, the number of the second groove is 3 or less, the number of the third groove is 1 or less, and the number of the fourth groove is 0.

More specifically when the polished surface of the casting body is divided into 1 cm×1 cm, the defect reduced region can be defined as a region that satisfies the conditions that the number of the first groove is 2 or less, the number of the second groove is 1 or less, the number of the third groove is 0, and the number of the fourth groove is 0.

Even more specifically, when the polished surface of the casting body is divided into 1 cm×1 cm, the defect reduced region can be defined as a region that satisfies the conditions that the numbers of the first groove, the second groove, the third groove, and the fourth groove are 0.

On the polished surface of the casting body, the area falling under the defect reduced region may be 90% or more of the area on which the precursor is cast. Specifically, on the polished surface of the casting body, the area falling under the defect reduced region may be 95% or more of the area on which the precursor is cast. More specifically, on the polished surface of the casting body, the area falling under the defect reduced region may be 99% or more of the area on which the precursor is cast.

The polished surface of the casting body may have a roughness of about 0.1 nm to 160 nm. Specifically, the polished surface of the casting body may have a roughness of about 0.1 nm to 60 nm. More specifically, the polished surface of the casting body may have a roughness of about 0.1 nm to 11 nm. Even more specifically, the polished surface of the casting body may have a roughness of about 0.1 nm to 3 nm, but it is not limited thereto. Here, the surface roughness of the casting body and that of a film refer to a root mean square surface roughness.

A precursor is prepared so as to be cast on the polished surface of the casting body. The precursor may comprise a polyamic acid or a polyamide-imide polymer.

For example, the precursor may be a polyamide-imide polymer solution.

The polyamide-imide polymer comprises an imide repeat unit derived from the polymerization of the aromatic diamine compound and the aromatic dianhydride compound and amide repeat units derived from the polymerization of the aromatic diamine compound and the dicarbonyl compound.

Since a film prepared from the polyamide-imide polymer contains an imide repeating unit, it may fall under a polyimide film in a broad sense.

Specifically, the precursor comprises a polymer formed by polymerizing an aromatic diamine compound, an aromatic dianhydride compound, and a dicarbonyl compound. The dicarbonyl compound may comprise a first dicarbonyl compound and/or a second dicarbonyl compound. For example, the polyimide-imide polymer may be obtained by polymerizing an aromatic diamine compound, an aromatic dianhydride compound, a first dicarbonyl compound, and a second dicarbonyl compound in an organic solvent.

The process for preparing a polyimide film according to an embodiment comprises polymerizing an aromatic diamine compound, an aromatic dianhydride compound, a first dicarbonyl compound, and a second dicarbonyl compound in an organic solvent to prepare a first polymer solution; further adding the second dicarbonyl compound to the first polymer solution to obtain a second polymer solution having a viscosity of 100,000 to 300,000 cps; and extruding and casting the second polymer solution and then drying and thermally treating the cast second polymer solution.

The organic solvent employed in the polymerization reaction may be at least one selected from the group consisting of dimethylformamide (DMF), dimethylacetamide (DMAc), N-methyl-2-pyrrolidone (NMP), in-cresol, tetrahydrofuran (THF), and chloroform, but it is not limited thereto.

The step of obtaining the first polymer solution may comprise simultaneously or sequentially polymerizing the aromatic diamine compound, the aromatic dianhydride compound, the first dicarbonyl compound, and the second dicarbonyl compound.

Specifically, the step of obtaining the first polymer solution may comprise simultaneously polymerizing the aromatic diamine compound, the aromatic dianhydride compound, the first dicarbonyl compound, and the second dicarbonyl compound.

In addition, the step of obtaining the first polymer solution may comprise polymerizing the aromatic diamine compound and the aromatic dianhydride compound to obtain a polyamic acid solution; and adding the first dicarbonyl compound and the second dicarbonyl compound to the polyamic acid solution to polymerize them.

The polyamic acid solution is a solution comprising a polyamic acid.

In a different way, the step of obtaining the first polymer solution may comprise polymerizing the aromatic diamine compound, the first dicarbonyl compound, and the second dicarbonyl compound to obtain an amide polymer solution; and adding the aromatic dianhydride compound to the amide polymer solution to polymerize them.

The amide polymer solution is a solution comprising a polymer having amide repeat units.

The aromatic diamine compound is a compound that forms an imide bond with the aromatic dianhydride compound and forms amide bonds with the dicarbonyl compound, to thereby form a copolymer.

In an embodiment, one kind of aromatic diamine may be used as the aromatic diamine compound. If a single kind of aromatic diamine compound is used, the chemical structure of the polyamide-imide polymer can be easily designed, and the process efficiency can be enhanced.

For example, the aromatic diamine compound may comprise 2,2'-bis(trifluoromethyl)-4,4'-diaminobiphenyl (TDB) represented by the following Formula 1, but it is not limited thereto.

[Formula 1]

The aromatic dianhydride compound is a compound that can contribute to improvements in the optical properties such as transmittance of the polyimide film, since it has a low birefringence value.

In an embodiment, one kind of aromatic dianhydride may be used as the aromatic diamine compound. If a single kind of aromatic diamine compound is used, the chemical structure of the polyimide-imide polymer can be easily designed, and the process efficiency can be enhanced.

For example, the aromatic dianhydride compound may comprise 2,2'-bis-(3,4-dicarboxyphenyl) hexafluoropropane dianhydride (6-FDA) represented by the following Formula 2, but it is not limited thereto.

[Formula 2]

The aromatic diamine compound and the dianhydride compound may be polymerized to form a polyamic acid.

Subsequently, the polyamic acid may be converted to a polyimide through a dehydration reaction, and the polyimide comprises an imide repeat unit.

For example, the polyimide may comprise a compound represented by the following Formula 3, but it is not limited thereto.

[Formula 3]

In the above Formula 3, n is an integer of 1 to 400.

The dicarbonyl compound may be a first dicarbonyl compound and/or a second dicarbonyl compound.

The first dicarbonyl compound and the second dicarbonyl compound may be an aromatic dicarbonyl compound, respectively.

The first dicarbonyl compound and the second dicarbonyl compound may be compounds different from each other.

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of the polyimide film thus produced.

In an embodiment, two kinds of aromatic dicarbonyl compound may be used as the dicarbonyl compound. If two kinds of aromatic dicarbonyl compound are used, the chemical structure of the polyimide-inside polymer can be designed to materialize the desired properties, and the process efficiency can be enhanced.

The dicarbonyl compound may be selected from 1,1'-biphenyl-4,4'-dicarbonyl dichloride (BPDC) and terephthaloyl chloride (TPC). But it is not limited thereto.

For example, the first dicarbonyl compound may comprise 1,1'-biphenyl-4,4'-dicarbonyl dichloride (BPDC) represented by the following Formula 4, but it is not limited thereto.

[Formula 4]

Further, the second dicarbonyl compound may comprise terephthaloyl chloride (TPC) represented by the following Formula 5, but it is not limited thereto.

[Formula 5]

If 1,1'-biphenyl-4,4'-dicarbonyl dichloride (BPDC) is used as the first dicarbonyl compound and terephthaloyl chloride (TPC) is used as the second dicarbonyl compound in a proper combination, the polyimide film thus produced may have high oxidation resistance.

In addition, the aromatic diamine compound and the dicarbonyl compound may be polymerized to form amide repeat units represented by the following Formulae 6 and 7.

[Formula 6]

[Formula 7]

In the above Formula 6, x is an integer of 1 to 400.

In the above Formula 7, y is an integer of 1 to 400.

A catalyst may be further added in the step of obtaining the first polymer solution.

Examples of the catalyst include, but are not limited to, beta picoline, acetic anhydride, and the like.

The further addition of the catalyst may expedite the reaction rate and produce the effect of enhancing the bonding force between the repeat unit structures or that within the repeat unit structure.

The aromatic diamine compound may comprise 2,2'-bis(trifluoromethyl)-4,4'-diaminobiphenyl (TFDB), the aromatic dianhydride compound may comprise 2,2'-bis(3,4-dicarboxyphenyl) hexafluoropropane dianhydride (6-FDA), the first dicarbonyl compound may comprise 1,1'-biphenyl-4,4'-dicarbonyl dichloride (BPDC), and the second dicarbonyl compound may comprise terephthaloyl chloride (TPC). But they are not limited thereto.

The aromatic diamine compound may be 2,2'-bis(trifluoromethyl)-4,4'-diaminobiphenyl (TFDB), the aromatic dianhydride compound may be 2,2'-bis(3,4-dicarboxyphenyl) hexafluoropropane dianhydride (6-FDA), the first dicarbonyl compound may be 1,1'-biphenyl-4,4'-dicarbonyl dichloride (BPDC), and the second dicarbonyl compound may be terephthaloyl chloride (TPC). But they are not limited thereto.

An embodiment is characterized in that it is capable of providing a polyimide film whose optical characteristics, mechanical properties, and flexibility are improved in a well-balanced manner without a complicated process by properly controlling the content of the imide repeat unit and those of the amide repeat units.

The content of the imide repeat unit and those of the amide repeat units may be iso controlled by the amounts of the aromatic dianhydride compound and the dicarbonyl compound.

In another embodiment, the step of obtaining the first polymer solution may comprise adding the aromatic dianhydride compound, the first dicarbonyl compound, and the second dicarbonyl compound to an excessive amount of the aromatic diamine compound.

Specifically, the aromatic dianhydride compound may be employed in an amount of 20% by mole to 50% by mole based on the total moles of the aromatic dianhydride compound, the first dicarbonyl compound, and the second dicarbonyl compound, but it is not limited thereto.

If the content of the aromatic dianhydride compound is within the above range, the polyimide film has excellent mechanical properties in terms of surface hardness, tensile strength, and the like.

In addition, the first dicarbonyl compound and the second dicarbonyl compound may be employed in an amount of 50% by mole to 80% by mole based on the total moles of the aromatic dianhydride compound, the first dicarbonyl compound, and the second dicarbonyl compound, but it is not limited thereto.

If the content of the dicarbonyl compounds is within the above range, the polyimide film has excellent optical properties in terms of light transmittance, haze, and the like.

In the step of obtaining the first polymer solution in another embodiment, the first dicarbonyl compound may be employed in an amount of 50% by mole to 70% by mole based on the total moles of the first dicarbonyl compound and the second dicarbonyl compound, but it is not limited thereto.

The first dicarbonyl compound may comprise 1,1'-biphenyl-4,4'-dicarbonyl dichloride (BPDC), and the second dicarbonyl compound may comprise terephthaloyl chloride (TPC).

If the content of the first dicarbonyl compound is less than 50% by mole, the tensile strength (or modulus) of the polyimide film may be deteriorated. If the content of the first dicarbonyl compound exceeds 70% by mole, such optical properties as haze and the like may be deteriorated.

Preferably, in the step of obtaining the first polymer solution, (i) an excessive amount of the aromatic diamine compound at least in the same molar amount as that of the other reactants, (ii) 20% by mole to 50% by mole of the aromatic dianhydride compound based on the total moles of the aromatic dianhydride compound, the first dicarbonyl compound, and the second dicarbonyl compound, and (iii) 50% by mole to 80% of the first dicarbonyl compound and the second dicarbonyl compound based on the total moles of the aromatic dianhydride compound, the first dicarbonyl compound, and the second dicarbonyl compound may be employed.

Specifically 50% by mole to 70% of the first dicarbonyl compound (e.g., 1,1'-biphenyl-4,4'-dicarbonyl dichloride, BPDC) and 30% by mole to 50% of the second dicarbonyl compound (e.g., terephthaloyl chloride, TPC) based on the total moles of the first dicarbonyl compound and the second dicarbonyl compound may be employed.

It is possible to provide a polyimide film whose optical characteristics, mechanical properties, and flexibility are improved in a well-balanced manner without such steps as precipitation, filtration, drying, and redissolution as adopted in the prior art by properly controlling the content of the imide repeat unit and those of the amide repeat units.

After the step of obtaining the first polymer solution, the second polymer solution having a viscosity of 100,000 to 500,000 cps may be obtained by further adding the second dicarbonyl compound to the first polymer solution.

The weight ratio of the second dicarbonyl compound added in the step of obtaining the first polymer solution to the second dicarbonyl compound added in the step of obtaining the second polymer solution may be 90:10 to 99:1, but it is not limited thereto.

In addition, the second dicarbonyl compound added in the step of obtaining the second polymer solution may be in the form of a solution in which the second dicarbonyl compound is dissolved in an organic solvent at a concentration of 5 to 20% by weight, but it is not limited thereto.

This is advantageous in that the desired viscosity can be accurately achieved.

The viscosity of the second polymer solution may be 100,000 to 500,000 cps or 150,000 to 350,000 cps, but it is not limited thereto.

If the viscosity of the second polymer solution is within the above range, a polyimide film can be effectively produced in the extrusion and casting steps. In addition, the polyimide film thus produced may have mechanical properties in terms of an improved modulus and the like.

In an embodiment, the content of solids contained in the second polymer solution may be 10% by weight to 20% by weight. Specifically, the content of solids contained in the second polymer solution may be 12% by weight to 18% by weight, but it is not limited thereto.

If the content of solids contained in the second polymer solution is within the above range, a polyimide film can be effectively produced in the extrusion and casting steps. In addition, the polyimide film thus produced may have mechanical properties in terms of an improved modulus and the like and optical properties in terms of a low yellow index and the like.

After the step of obtaining the second polymer solution, the second polymer solution is extruded and cast, followed by drying the cast polymer solution to prepare a polyimide film.

In the above extrusion and casting steps, the above-mentioned organic solvent may be used.

The second polymer solution is extruded and cast onto the polished surface of the casting body. In such event, the second polymer solution is cast at a rate of about 5 m/min to about 15 m/min in a thickness of 400 to 500 μm onto the casting body. If the extrusion and casting rate is within the above ranges, the polyimide film thus prepared by the preparation process according to the embodiment can have improved optical characteristics and mechanical characteristics.

That is, if the second polymer solution has a viscosity in the above-mentioned range, the extrusion and casting at the extrusion rate as described above may be advantageous to have improved optical characteristics and mechanical characteristics.

After the second polymer solution is cast onto the casting body, the solvent contained in the second polymer solution is removed by a drying step to thereby form a gel sheet on the casting body.

The drying step may be carried out at a temperature of about 60° C. to about 150° C. for a period of time ranging from about 5 minutes to about 60 minutes.

Thereafter, the gel sheet is thermally treated to thereby produce the polyimide film according to the embodiment.

The thermal treatment may be carried out in a temperature range of 60 to 470° C. for 5 to 20 minutes. In more detail, the thermal treatment may be carried out for 5 to 15 minutes in an inline thermal treatment apparatus having in an inlet temperature of about 80° C. to about 300° C. and a temperature elevation rate of PC/min to 25° C./min.

Since the polyamide-imide polymer has high oxidation resistance, it is hardly affected by oxygen contained in the atmosphere during the thermal treatment step. Thus, the polyimide film according to the embodiment may have improved optical characteristics.

In addition, nitrogen gas purging is carried out when a polyimide film is formed in the conventional process in order to prevent yellowing of the film and to secure transparency of the film. According to the embodiment, however, a polyimide film having excellent optical characteristics can be produced without such nitrogen gas purging.

In addition, as the polyimide film has appropriate crystallinity, it can have excellent mechanical properties. For example, if the strength is measured when the polyimide film is perforated while it is compressed using a 2.5 mm spherical tip in a UTM compression mode, the perforation strength may be about 20 kgf or more based on a thickness of 30 to 50 μm.

Specifically, the perforation strength may be about 25 kgf or more under these conditions. More specifically, the perforation strength may be about 30 kgf or more under these conditions.

In addition, the diameter of the perforation including a crack or the like may be about 55 mm or less. Specifically, the diameter of the perforation may be about 50 mm or less. More specifically, the diameter of the perforation may be about 40 mm or less. Even more specifically, the diameter of the perforation may be about 30 mm or less.

Further, the polyimide film according to the embodiment may contain inorganic particles such as silica particles or the like. The diameter of the silica particles may be about 10 nm to 200 nm. In the polyimide film according to the embodiment, the number of silica particles on the surface visible on an atomic force microscope (AFM) image may be about 5 to about 30 based on a size of 10 μm×10 μm. Accordingly, the polyimide film according to the embodiment can have improved windability and a low haze.

The polyimide film according to the embodiment may have an orientation angle of about ±30° to about ±50° with respect to the machine direction (or MD). If the polyimide film according to the embodiment has an orientation angle in the above range, it may have improved optical and mechanical characteristics. The orientation angle of the polyimide film refers to the angle at which the polyimide resin inside the film is oriented with respect to the direction (i.e., MD) in which the polyimide film is cast.

The polyimide film prepared according to the embodiment has a modulus of 5 GPa or more. For example, the modulus of the polyimide film may be 5 GPa to 10 GPa. Specifically, the modulus of the polyimide film according to the embodiment may be 5.2 GPa or more. In more detail, the modulus of the polyimide film according to the embodiment may be 5.5 GPa or more. In more detail, the modulus of the polyimide film according to the embodiment may be 6.0 GPa or more. The maximum modulus of the polyimide film according to the embodiment may be 10 GPa.

The polyimide film may have a surface hardness of about HB or higher based on a thickness of 20 μm to 70 μm or based on a thickness of 25 μm to 60 μm in more detail. In more specifically the surface hardness of the polyimide film according to the embodiment may be about H or higher based on the thickness as described above.

Figure 4:
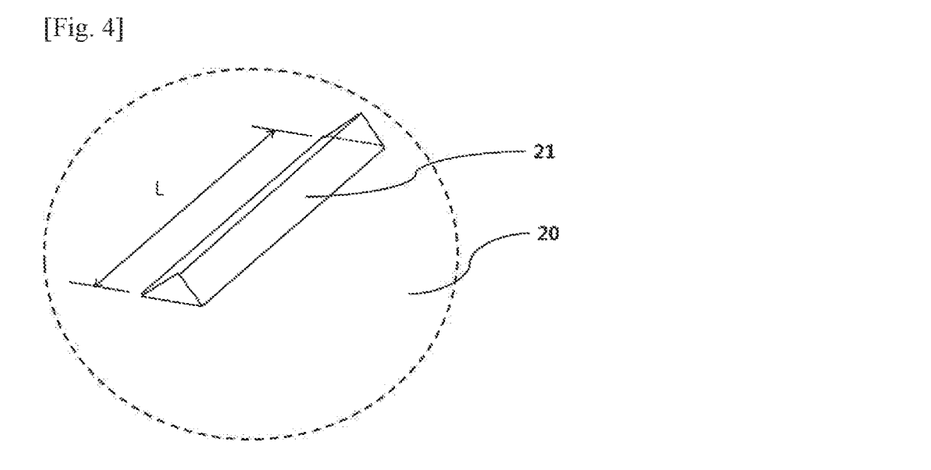
FIG. 4 is a drawing that illustrates a part of the first surface of a polyimide film according to an embodiment.
Figure 5:
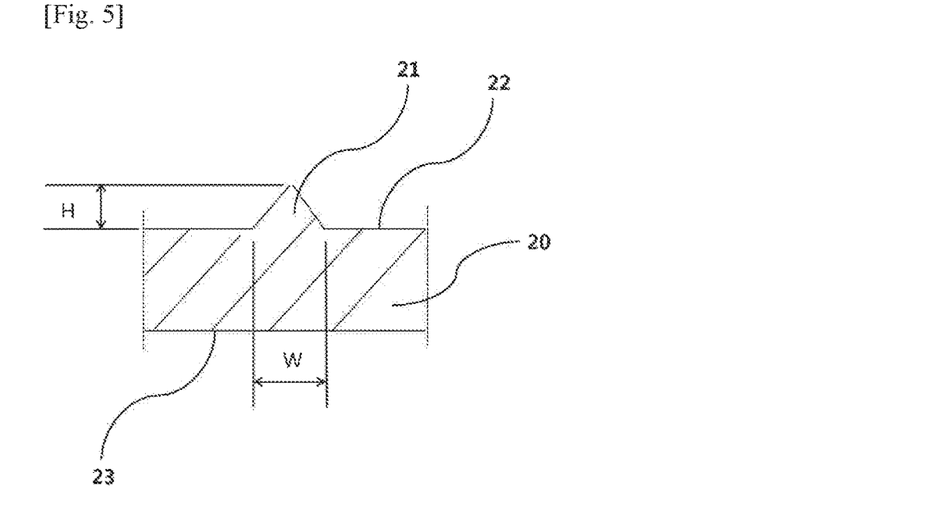
FIG. 5 is a cross-sectional view of a polyimide film according to an embodiment.

As shown in FIGS. 4 and 5, a polyimide film (20) according to an embodiment comprises a first surface (22) that is in direct contact with the casting surface of the casting body and a second surface (23) opposite to the first surface (22).

Since the first surface (22) is formed in direct contact with the polished surface of the casting body, the roughness of the first surface (22) is higher than the roughness of the second surface (23). In addition, the polished surface of the casting body may be directly transferred to the first surface (22). Accordingly, the first surface (22) may have a shape corresponding to the polished surface of the casting body.

Protrusions (21) may be formed on the first surface (22) by transfer of the grooves formed on the polished surface of the casting body. The protrusions (21) may have an impact on the mechanical and optical characteristics of the polyimide film. In particular, the protrusions (21), which may affect the mechanical and optical characteristics of the polyimide film, may be defined in terms of width (W), height (H), and length (L), as follows.

A first protrusion has a width of 0.3 μm to 3 μm, a height of 0.5 μm to 5 μm, and a length of 2 μm to less than 3 μm. A second protrusion has a width of 0.3 μm to 3 μm, a height of 0.5 μm to 5 μm, and a length of 3 μm to less than 5 μm. A third protrusion has a width of 0.3 μm to 3 μm, a height of 0.5 μm to 5 μm, and a length of 5 μm to less than 10 μm. A fourth protrusion has a width of 0.3 μm to 3 μm, a height of 0.5 μm to 5 μm, and a length of 10 μm or more. Specifically, the fourth protrusion has a length of 10 μm to 100,000 μm.

In another embodiment, the first protrusion has a width of 0.2 μm to 3 μm, a height of 0.3 μm to 5 μm, and a length of 2 μm to less than 3 μm. The second protrusion has a width of 0.2 μm to 3 μm, a height of 0.3 μm to 5 μm, and a length of 3 μm to less than 5 μm. The third protrusion has a width of 0.2 μm to 3 μm, a height of 0.3 μm to 5 μm, and a length of 5 μm to less than 10 μm. The fourth protrusion has a width of 0.2 μm to 3 μm, a height of 0.3 μm to 5 μm, and a length of 10 μm or more.

In another embodiment, the first protrusion has a width of 0.15 μm to 3 μm, a height of 0.2 μm to 5 μm, and a length of 2 μm to less than 3 μm. The second protrusion has a width of 0.15 μm to 3 μm, a height of 0.2 μm to 5 μm, and a length of 3 μm to less than 5 μm. The third protrusion has a width of 0.15 μm to 3 μm, a height of 0.2 μm to 5 μm, and a length of 5 μm to less than 10 μm. The fourth protrusion has a width of 0.15 μm to 3 μm, a height of 0.2 μm to 5 μm, and a length of 10 μm or more.

The first surface may be divided into 1 cm×1 cm. If the following conditions are satisfied on each of the divided first surfaces, it can be defined as a defect free region.

When the first surface is divided into 1 cm×1 cm, the defect free region can be defined as a region that satisfies the conditions that the number of the first protrusion is 10 or less, the number of the second protrusion is 5 or less, the number of the third protrusion is 3 or less, and the number of the fourth protrusion is 0.

In other words, the defect free region refers to a region that satisfies the conditions that the numbers of the first protrusion, the second protrusion, the third protrusion, and the fourth protrusion, which have a width of 0.3 μm to 3 μm, a height of 0.5 μm to 5 μm, and a length of 2 μm to less than 3 μm, 3 μm to less than 5 μm, 5 μm to less than 10 μm, and 10 μm or more, respectively, are 10 or less, 5 or less, 3 or less, and 0, respectively, in the divided area of 1 cm×1 cm.

In another embodiment, the defect free region refers to a region that satisfies the conditions that the numbers of the first protrusion, the second protrusion, the third protrusion, and the fourth protrusion, which have a width of 0.2 μm to 3 μm, a height of 0.3 μm to 5 μm, and a length of 2 μm to less than 3 μm, 3 μm to less than 5 μm, 5 μm to less than 10 μm, and 10 μm or more, respectively, are 10 or less, 5 or less, 3 or less, and 0, respectively, in the divided area of 1 cm×1 cm.

In another embodiment, the defect free region refers to a region that satisfies the conditions that the numbers of the first protrusion, the second protrusion, the third protrusion, and the fourth protrusion, which have a width of 0.15 μm to 3 μm, a height of 0.2 μm to 5 μm, and a length of 2 μm to less than 3 μm, 3 μm to less than 5 μm, 5 μm to less than 10 μm, and 10 μm or more, respectively, are 10 or less, 5 or less, 3 or less, and 0, respectively, in the divided area of 1 cm×1 cm.

Specifically, when the first surface is divided into 1 cm×1 cm, the defect free region can be defined as a region that satisfies the conditions that the number of the first protrusion is 5 or less, the number of the second protrusion is 3 or less, the number of the third protrusion is 1 or less, and the number of the fourth protrusion is 0.

More specifically, when the first surface is divided into 1 cm×1 cm, the defect free region can be defined as a region that satisfies the conditions that the number of the first protrusion is 5 or less, the number of the second protrusion is 3 or less, the number of the third protrusion is 0, and the number of the fourth protrusion is 0.

Specifically, when the first surface is divided into 1 cm×1 cm, the defect free region can be defined as a region that satisfies the conditions that the number of the first protrusion is 3 or less, the number of the second protrusion is 3 or less, the number of the third protrusion is 1 or less, and the number of the fourth protrusion is 0.

More specifically, when the first surface is divided into 1 cm×1 cm, the defect free region can be defined as a region that satisfies the conditions that the number of the first protrusion is 2 or less, the number of the second protrusion is 1 or less, the number of the third protrusion is 0, and the number of the fourth protrusion is 0.

Even more specifically, when the first surface is divided into 1 cm×1 cm, the defect free region can be defined as a region that satisfies the conditions that the numbers of the first protrusion, the second protrusion, the third protrusion, and the fourth protrusion are 0.

The area falling under the defect free region may be 90% or more of the first surface. Specifically, the area falling under the defect free region may be 95% or more of the first surface. More specifically, the area falling under the defect free region may be 99% or more of the first surface.

The first surface may have a roughness of about 0.1 nm to 150 nm. Specifically, the first surface may have a roughness of about 0.1 nm to 50 nm. More specifically, the first surface may have a roughness of about 0.1 nm to 10 nm. Even more specifically, the first surface may have a roughness of about 0.1 nm to 3 nm, but it is not limited thereto.

The surface roughness of the second surface may be smaller than the surface roughness of the first surface. The second surface may have a roughness of about 0.1 nm to 40 nm. Specifically, the second surface may have a roughness of about 0.1 nm to 20 nm. More specifically, the second surface may have a roughness of about 0.1 nm to 5 nm. Even more specifically, the second surface may have a roughness of about 0.1 nm to 2 nm, but it is not limited thereto.

The polyimide film according to the embodiment, which is prepared as described above, may have improved mechanical and optical characteristics.

The polyimide film prepared according to the embodiment may have a transmittance measured at 550 nm of 88% or more, a haze of 2% or less, and a yellow index (YI) of 5 or less based on a thickness of 20 μm to 70 μm or based on a thickness of 25 μm to 60 μm in more detail.

Specifically, the polyimide film prepared according to the embodiment may have a transmittance measured at 550 nm of 88% or more, a haze of 1% or less, and a yellow index (YI) of 3 or less based on a thickness of 20 μm to 70 μm or based on a thickness of 25 μm to 60 μm in more detail.

Further, the polyimide film prepared according to the embodiment may have a transmittance measured at 550 nm of 89% or more, a haze of 0.6% or less, and a yellow index (YI) of 3 or less based on a thickness of 20 μm to 70 μm or based on a 115 thickness of 25 μm to 60 μm in more detail.

Figure 6:
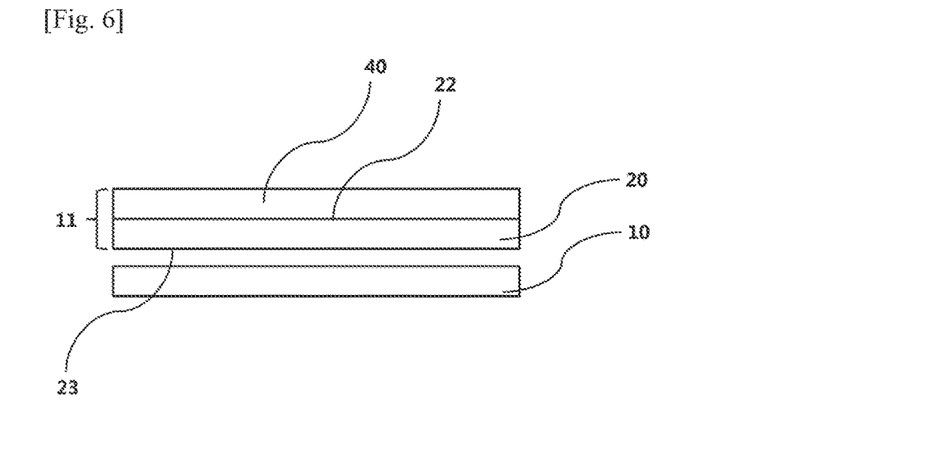
FIG. 6 is a schematic view of a display device according to an embodiment.

As shown in FIG. 6, a display device according to an embodiment comprises a display panel (10); and a cover window (11) disposed on the display panel (10).

The display panel (10) may be a liquid crystal panel or an organic EL panel.

The organic EL panel displays an image by self-emission of a pixel unit. The organic EL panel may comprise an organic EL substrate and a driving substrate.

The organic EL substrate comprises a plurality of organic electroluminescent units, each of which corresponds to a pixel. The organic electroluminescent units may comprise a cathode, an electron transport layer, a light emitting layer, a hole transport layer, and an anode. A detailed description on the constitution of the cathode and the like is omitted here.

The driving substrate is operatively coupled to the organic EL substrate. That is, the driving substrate may be coupled to the organic EL substrate so as to apply a driving signal such as a driving current. In more detail, the driving substrate can drive the organic EL substrate by applying a current to the organic electroluminescent units, respectively.

The cover window (11) is disposed on the display panel (10). The cover window (11) covers the display panel (10). The cover window (11) is located at the outermost position of the display device according to the embodiment to thereby protect the display panel.

The cover window (11) may comprise a polyimide film (70) according to the embodiment and a hard coating layer (40). The hard coating layer (40) may be formed on the first surface (22). The hard coating layer (40) covers the first surface (22). That is, the hard coating layer (40) can compensate the optical characteristics of the second surface (22) having a relatively high roughness. Examples of the material used for the hard coating layer (40) include an acrylic resin and the like.

Since the polyimide film (20) according to the embodiment has improved mechanical and optical characteristics, the cover window (11) can have improved mechanical and optical characteristics as well. In addition, the cover window (11) can be applied to a flexible display such as a foldable display or the like to materialize an improved folding characteristic. That is, the display device according to the embodiment may be a flexible display. The display panel (10) and the cover window (11) can be easily bent, and the display device according to the embodiment can have improved image quality and improved folding and bending characteristics.

MODE FOR THE INVENTION

Hereinafter, the present invention will be described in detail by referring to Examples. But the following Examples are intended to further illustrate the present invention, and the scope of the present invention is not limited thereto.

Preparation Example

A 1 L glass reactor equipped with a temperature-controllable double jacket was charged with 710.8 g of dimethyl acetamide (DMAc) as an organic solvent at 20° C. under a nitrogen atmosphere. Then, 64 g (0.2 mole) of 2,2'-bis(trifluoromethyl)-4,4'-diaminobiphenyl (TFDB) as an aromatic diamine was slowly added thereto for dissolution thereof.

Subsequently, while 26.6 g (0.06 mole) of 2,2'-bis(3,4-dicarboxyphenyl) hexafluoropropane dianhydride (6-FDA) as an aromatic dianhydride was slowly added thereto, the mixture was stirred for 1 hour.

Then, 23.4 g (0.084 mole) of 1,1'-biphenyl-4,4'-dicarbonyldichloride (BPDC) as a first dicarbonyl compound was added, followed by stirring for 1 hour. And 9.74 g (0.048 mole) of terephthaloyl chloride (TPC) as a second dicarbonyl compound was added, followed by stirring for 1 hour, thereby preparing a first polymer solution.

The viscosity of the first polymer solution thus prepared was measured. If the measured viscosity did not reach the target viscosity, a TPC solution in a DMAc organic solvent at a concentration of 10% by weight was prepared, and 1 mL of the TPC solution was added to the first polymer solution, followed by stirring for 30 minutes. This procedure was repeated until the viscosity became 35 cps, thereby preparing a second polymer solution.

Example

A stainless steel plate (stainless steel 1.4301 of Weidmüller having a thickness 1.5 mm) was cut to prepare a stainless steel plate having a diameter of 30 cm. Thereafter, while an abrasive slurry was sprayed, the surface of the stainless steel plate was polished by rotating a disc-shaped porous polyurethane polishing body at a speed of about 100 rpm. In the abrasive slurry, water was employed as a solvent, and colloidal silica of about 30 nm and hydrogen peroxide as an oxidizing agent were contained in amounts of about 10% by weight and about 5% by weight, respectively, based on the total weight of the slurry. The pH of the abrasive shiny was about 2.6, and the polishing pressure of the polishing body was about 3 psi. The polishing step was carried out for about 5 minutes. Upon completion of the polishing step, the polished stainless steel plate was rinsed with deionized water.

Thereafter, the second polymer solution prepared in the above Preparation. Example was applied to the polished surface of the stainless steel plate and then dried with hot air at 80° C. for 30 minutes. The dried polyimide polymer was peeled off from the stainless steel plate, fixed to a pin frame, and thermally treated in a temperature range of 80° C. to 300° C. at a temperature elevation rate of 2° C./min to produce a polyimide film having a thickness of 50 μm.

Comparative Example

The same procedures as in the Example were carried out to prepare a polyimide film, except for the step of polishing the stainless steel plate.

Evaluation Example

The polyimide films according to the Example and the Comparative Example were measured and evaluated for the following properties. The results are shown in Table 1 below.

Evaluation Example 1: Measurement of Film Thickness 5 points were measured in the width direction with a Digital Micrometer 547-401 manufactured by Mitsutoyo Corporation, Japan, and an average value thereof was taken as a thickness.

Evaluation Example 2: Measurement of Transmittance (TT) and Haze (HZ)

The transmittance at 550 nm and the haze were measured using a haze meter NDH-5000W manufactured by Nippon Denshoku Kogyo.

Evaluation Example 3: Measurement of Yellow Index (YI)

The yellow Index (YI) was measured with a spectrophotometer (UltraScan PRO, Hunter Associates Laboratory) using a CIE colorimetric system.

Evaluation Example 4: Measurement of Modulus

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The slope of the load with respect to the initial strain in the stress-strain curve was taken as a modulus (GPa).

Evaluation Example 5: Observation of Surface

The surface of the stainless steel plate and that of the polyimide film were observed with a LEXT OLS 4000-3D laser measurement microscope from Opto Korea to see scratches and the like.

5-1: Defect Reduced Region

The surface of the stainless steel plate was divided into 1 cm×1 cm, and each divided region was observed. If the number of the first groove was 2 or less, that of the second groove was 1 or less, and those of the third groove and the fourth groove were 0, the region was defined as a defect reduced region.

The widths of the first groove, the second groove, the third groove, and the fourth groove were 0.15 μm to 3 μm. The depths of the first groove, the second groove, the third groove, and the fourth groove were 0.2 μm to 5 μm. The length of the first groove was 2 μm to less than 3 μm, that of the second groove was 3 μm to less than 5 μm, that of the third groove was 5 μm to less than 10 μm, and that of the fourth groove was 10 μm or more.

5-2: Defect Free Region

The surface of the stainless steel plate was divided into 1 cm×1 cm, and each divided region was observed. If the number of the first protrusion was 2 or less, that of the second protrusion was 1 or less, and those of the third protrusion and the fourth protrusion were 0, the region was defined as a defect free region.

The widths of the first protrusion, the second protrusion, the third protrusion, and the fourth protrusion were 0.15 μm to 3 μm. The heights of the first protrusion, the second protrusion, the third protrusion, and the fourth protrusion were 0.2 μm to 5 μm. The length of the first protrusion was 2 μm to less than 3 μm, that of the second protrusion was 3 μm to less than 5 μm, that of the third protrusion was 5 μm to less than 10 μm, and that of the fourth protrusion was 10 μm or more.

The surface for observing the protrusions was the surface (i.e., first surface) in direct contact with the stainless steel.

Evaluation Example 6: Surface Roughness

The surface roughness was measured with AFM equipment (manufacturer: Park System, equipment name: XE-150).

TABLE 1

| | Thickness (μm) | TT (%) | HZ (%) | YI | Modulus (GPa) | Surface hardness |
|---|---|---|---|---|---|---|
| Example | 50 | 89.8 | 0.53 | 2.56 | 6.01 | H |
| Comparative Example | 50 | 89.5 | 1.51 | 2.1 | 6.02 | H |

TABLE 2

| | Surface roughness of the polished surface of the stainless steel plate | Defect reduced region of the surface of the stainless steel plate |
|---|---|---|
| Example | 0.85 nm | 100 |
| Comparative Example | 166 nm | 0 |

TABLE 3

| | Surface roughness of the polyimide film (first surface/second surface) | Defect free region of the surface (i.e., first surface of the polyimide film (%) |
|---|---|---|
| Example | 0.75 nm/0.6 nm | 100 |
| Comparative Example | 153 nm/43 nm | 0 |

As can be seen from Table 2, any grooves having a depth of 100 nm or more were hardly observed on the polished surface of the stainless steel plate according to the Example. In contrast, grooves having a depth of 0.5 μm or more and a length of 10 μm or more were uniformly observed on almost the entire unpolished surface of the stainless steel plate according to the Comparative Example.

As can be seen from Table 3, any protrusions having a height of 100 nm or more were hardly observed on the surface (i.e., first surface) of the polyimide film in direct contact with the stainless steel plate according to the Example. In contrast, protrusions having a height of 0.5 μm or more and a length of 10 μm or more were uniformly observed on almost the entire first surface of the polyimide film according to the Comparative Example.

In addition, as can be seen from Tables 1 to 3, the film of the Example had improved mechanical and optical properties and a lower surface roughness as compared with that of the Comparative Examples. Further, since the film of the Example is excellent in flexibility, it can be advantageously used in the flexible display field.

The invention claimed is:

1. A polyimide film, which has a yellow index of 3 or less, a haze of 1% or less, a transmittance of 88% or more, a modulus of 5.0 GPa or more, and a surface hardness of HB or higher, and which comprises a first surface having a surface roughness of 0.1 nm to 150 nm and a second surface opposite to the first surface and having a surface roughness of 0.1 nm to 40 nm, wherein when the first surface is divided into 1 cm×1 cm, the area falling under a defect free region is 90% or more, the defect free region referring to a region that satisfies the conditions that the numbers of a first protrusion, a second protrusion, a third protrusion, and a fourth protrusion, which have a width of 0.3 μm to 3 μm, a height of 0.5 μm to 5 μm, and a length of 2 μm to less than 3 μm, 3 μm to less than 5 μm, 5 μm to less than 10 μm, and 10 μm or more, respectively, are 10 or less, 5 or less, 3 or less, and 0, respectively, in the divided area of 1 cm×1 cm, and wherein the polyimide film is prepared from a polyamide-imide polymer formed by polymerizing an aromatic diamine compound, an aromatic dianhydride compound, and a dicarbonyl compound, wherein the aromatic diamine compound comprises 2,2'-bis(trifluoromethyl)-4,4'-diaminobiphenyl (TFDB), the aromatic dianhydride compound comprises 2,2'-bis(3,4-dicarboxyphenyl) hexafluoropropane dianhydride (6-FDA), and the dicarbonyl compound comprises terephthaloyl chloride (TPC), 1,1'-biphenyl-4,4'-dicarbonyl dichloride (BPDC), or a combination thereof.

2. A cover window, which comprises the polyimide film of claim 1.

3. The cover window of claim 2, which further comprises a hard coating layer formed on the first surface.

4. A display device comprising:
a display panel; and
the cover window of claim 2 disposed on the display panel.

* * * * *